United States Patent [19] [11] Patent Number: 5,709,128
Skyman [45] Date of Patent: Jan. 20, 1998

[54] REVERSING GEAR FOR BOATS

[75] Inventor: Lars Skyman, Gothenburg, Sweden

[73] Assignee: AB Volvo Penta, Gothenburg, Sweden

[21] Appl. No.: 464,757

[22] PCT Filed: Nov. 3, 1994

[86] PCT No.: PCT/SE94/01036

§ 371 Date: Jun. 22, 1995

§ 102(e) Date: Jun. 22, 1995

[30] Foreign Application Priority Data

Nov. 3, 1993 [SE] Sweden ............................ 9303632

[51] Int. Cl.$^6$ .................. B63H 23/08; F16H 63/30; F16D 21/04
[52] U.S. Cl. ............................... 74/323; 192/98
[58] Field of Search ...................... 74/322, 323; 192/98

[56] References Cited

U.S. PATENT DOCUMENTS

| | | | |
|---|---|---|---|
| 774,837 | 11/1904 | Eshelman | 74/322 |
| 1,149,283 | 8/1915 | Pfeiffer | 74/323 |
| 1,418,429 | 6/1922 | Carpenter | 74/323 |
| 3,788,157 | 1/1974 | Carlson et al. | 192/98 |
| 4,630,719 | 12/1986 | McCormick | |

FOREIGN PATENT DOCUMENTS 30 24 999  11/1983  Germany .
37 21 014  5/1993  Germany .

*Primary Examiner*—Dirk Wright
*Attorney, Agent, or Firm*—Young & Thompson

[57] ABSTRACT

Reversing gear for boats, comprising a displaceable engaging sleeve (10) with a V-shaped groove (22), into which there extends a gear selector in the form of a dog (21) on a pin (29) movable in the axial direction of the engaging sleeve. The pin is excentrically mounted in a rotatable sleeve (31). A ball-and-socket joint (27,28) between the dog and the pin assures that the dog will retain its orientation and contact surface in the groove during the shifting movement.

4 Claims, 1 Drawing Sheet

REVERSING GEAR FOR BOATS

FIELD OF THE INVENTION

The present invention relates to a transmission, e.g. a reversing gear for boats, comprising a shaft, a pair of gears provided with friction elements and freely rotatably mounted on said shaft, an engaging sleeve with frictional surfaces and displaceable on said shaft, said frictional surfaces being disposed to cooperate with the frictional elements of the gears to lock one of the gears to the shaft, and a dog which extends radially into a V-groove disposed excentrically in relation to the rotational axis of the engaging sleeve, and is joined to a pin housed in a box in a rotational sleeve element, said bore running excentrically relative to the axis of rotation of the sleeve element so that rotation of the sleeve element results in displacement of the dog in the longitudinal direction of the shaft.

BACKGROUND OF THE INVENTION

A reversing gear for boats of the above mentioned type, which is known for example by SE-A-194 544, has the basic feature that the engaging sleeve and the shaft have cooperating threads, which amplify the engaging forces. For shifting, a relatively high disengaging force is required, and this is difficult to achieve without some form of servo assistance. One method is to extract servo force via the input torque to the transmission by means of a dog and an engaging sleeve with an excentric groove as described in the above mentioned publication. Upon relative rotation between the dog and the excentric groove, a knocking effect is achieved when the dog is moved axially to move the engaging sleeve in a disengaging direction, and thus a low manual disengaging force is sufficient.

Since the axial displacement of the dog is achieved by rotating a sleeve element in which a pin solidly joined to the dog is journalled, the dog will move when axially displaced along a circular arc at the same time, which will mean that it also moves tangentially. This means that the dog, which has a curvature corresponding to the curvature of the V-shaped groove, can in principle only have one position with perfect surface contact with the groove. In the known embodiment, this position is the neutral position of the reversing gear. Upon tangential movement during the shifting movement, the contact surface will be reduced between the dog and the groove. Thus, this design places great demands on the strength of materials and machining accuracy.

SUMMARY OF THE INVENTION

The purpose of the present invention is to provide a transmission of the type described by way of introduction, in which it is possible to maintain the same good surface contact between the dog and the groove in the shift positions as in the neutral position.

This is achieved according to the invention by virtue of the fact that the dog is connected to the pin via an articulated joint which permits pivoting of the dog relative to the pin around at least one pivot axis, which is parallel to the rotational axis of the engaging sleeve.

With the aid of the articulated joint, the dog can automatically adapt itself so that it will always lie correctly in the groove in the engaging sleeve. This provides better shifting properties, less wear on the components and longer useful life.

In a preferred embodiment of the transmission according to the invention, the articulated joint is a ball-and-socket joint in connection with a central portion of a dog which extends over approximately a semi-circle. Said central portion and portions at each end of the semi-circle extend deeper into the V-shaped groove than the portions therebetween. The actual displacement of the engaging sleeve is achieved primarily by means of the central portion, which can have a peripheral extent corresponding to that of the known dog. The end portions are primarily intended to reduce tendencies of the dog to tip, which would otherwise be the case when, for reasons of space, it is necessary to use a ball-and-socket joint, the pivot center of which lies outside the dog surfaces in contact with the V-shaped groove.

BRIEF DESCRIPTION OF THE DRAWINGS

The invention will be described in more detail with reference to embodiments shown in the accompanying drawing, where.

DETAILED DESCRIPTION OF THE INVENTION

Figure 1:
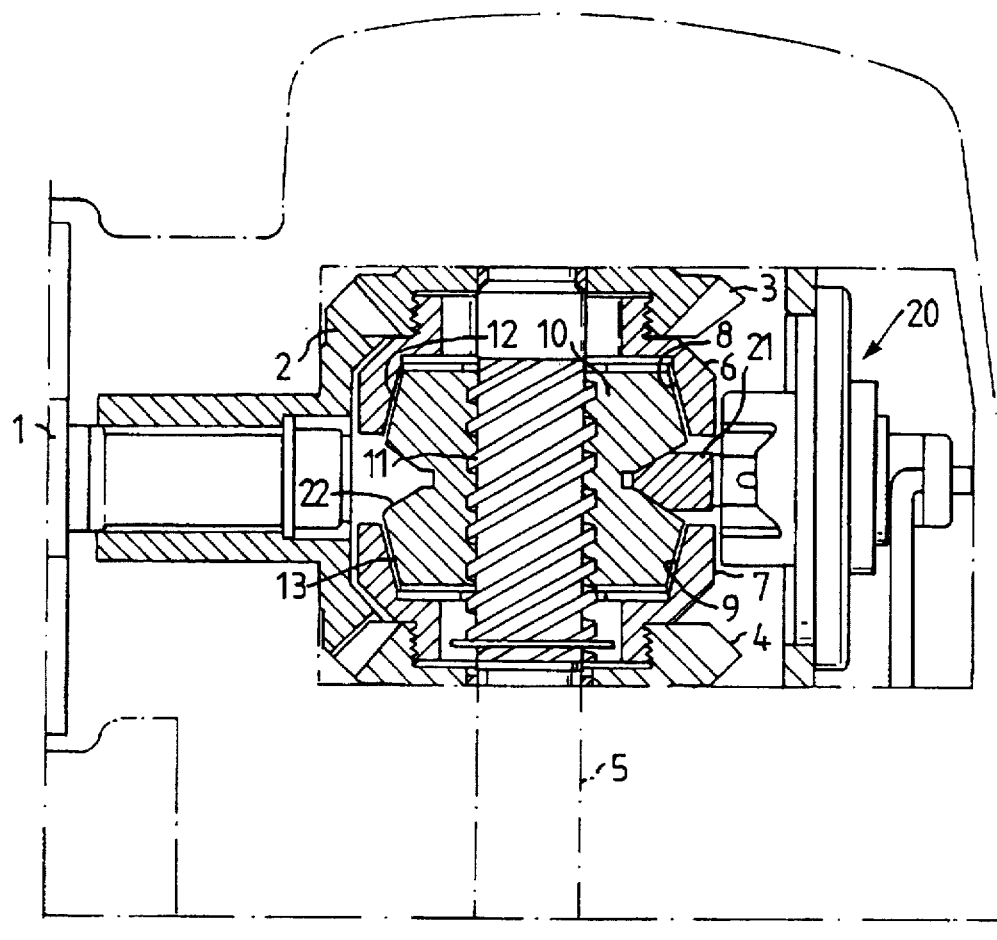
FIG. 1 shows a longitudinal section through a partially schematically shown transmission according to the invention.

FIG. 1 shows schematically the upper portion of a propeller drive unit of so-called Aquamatic® type. The drive unit has an input shaft 1, having a bevel gear 2 in engagement with a pair of bevel gears 3 and 4, which are freely rotatably mounted on an intermediate shaft 5. The gears 3,4 are each joined to an individual clutch cone 6,7 which has internal conical frictional surfaces 8,9. Between the clutch cone 6,7 there is an internally threaded engaging sleeve 10 screwed onto an externally threaded portion 11 of the intermediate shaft 5. The engaging sleeve 10 has conical frictional surfaces 12,13, which are adapted to the frictional surfaces 8,9. By displacing the engaging sleeve 10 axially in either direction, the gears 3,4 can be alternately locked to the shaft 5.

20 generally designates a shifting mechanism for displacing the engaging sleeve 10. The shifting mechanism is shown separately in FIG. 2 and comprises a dog 21 in the form of an arcuate fork, which engages into a V-shaped groove 22 in the engaging sleeve and in the embodiment shown has a circumscribed angle of 180°. The dog 21 has a central portion 23 and end portions 24, which in the neutral position (see FIG. 1) extend to the bottom of the V-shaped groove. Portions 25 therebetween have no contact with the groove. The dog 21 is completely symmetrical relative to the center axis "a" of a radial bore 26, which has a semi-spherical bottom portion 27. A semi-spherical complementary end portion 28 of a pin 29 is received in the semi-spherical bottom portion 27 and is fixed axially by means of a lock ring 30 received in a groove. The dog 21 is thus limitedly pivotable in all directions relative to the pin 29.

A sleeve element 31 is rotatably and displaceably mounted in a bore 32 in a stationary cover 33 to the transmission housing and has a bore 34 located excentrically relative to the axis of symmetry "b" of the sleeve element 31. The pin 29 is rotatably and displaceably mounted in said bore 34. The pin 29 is made with a central channel 35 containing a helical spring 36 under tension, the ends of said spring abutting against the bottom of the channel 35 and against the end surface of a plug 37 which is screwed into a threaded portion of the channel 35 and permits adjustment of the bottom position of the pin 29 against the sleeve element 31. A pin 40 mounted in the sleeve element 31 is in contact with a cam curve 41 on the cover 33 in order to achieve in a known manner axial displacement of the sleeve element 31 towards the engaging sleeve 10 when shifting from an engaged position to the neutral position.

Figure 2:
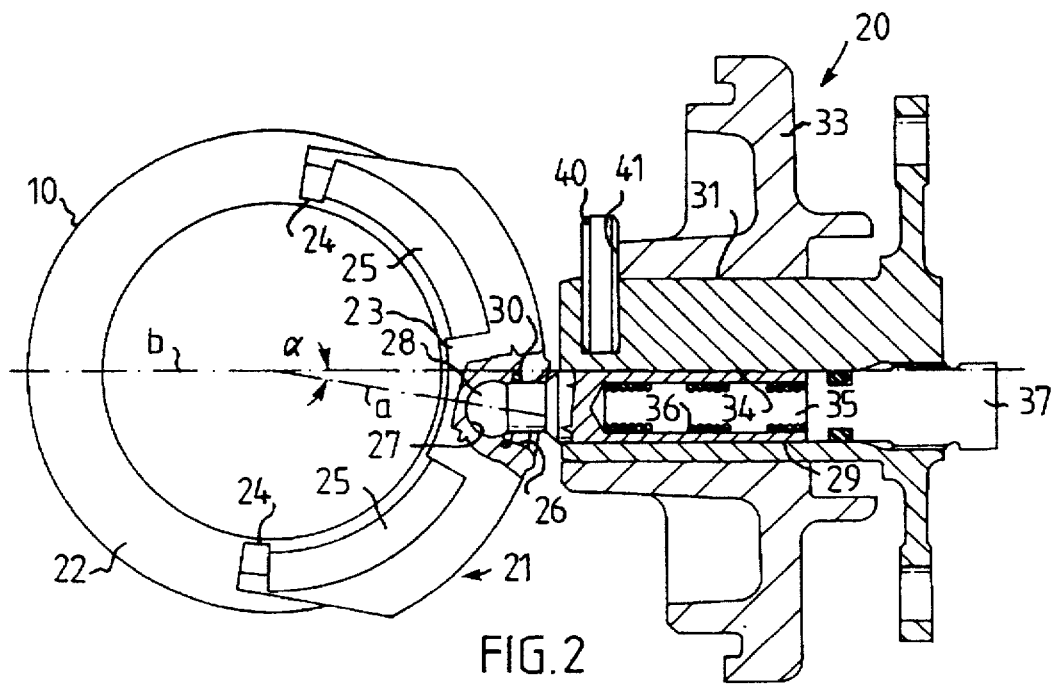
FIG. 2 is a partially sectioned detail view from above of one embodiment of a shifting mechanism in the transmission.

FIG. 2 shows the shifting mechanism in the neutral position. As can be seen in FIG. 2, the axis of symmetry "a" of the dog 21 forms an angle a with the axis of symmetry "b" of the sleeve element 31. To engage a gear, the pin 29 is moved in parallel to and towards the axis of symmetry "b", thus pivoting the dog 21 about an axis which is parallel to the rotational axis of the coupling sleeve 10. The portions 23 and 24 of the dog 21 will maintain their orientation relative to the groove 22, so that the dog will assume the correct contact in the groove even in the engaged positions. In the example shown, the center of the ball-and-socket joint between the pin 29 and the dog lies radially outside the contact surfaces of the dog against the V-shaped groove. The primary purpose of the end portions 24 is in this case to prevent tipping of the central portion 23 during the shifting movement. If the ball-and-socket joint and the groove were dimensioned so that there was room for the center of joint in the middle of the groove, it would in principle be sufficient to have a dog which only consisted of the central portion 23.

I claim:

1. Transmission comprising: a shaft, a pair of gears provided with frictional elements and freely rotatably mounted on said shaft, an engaging sleeve with frictional surfaces and displaceable on said shaft, said frictional surfaces being disposed to cooperate with the frictional elements of the gears to lock one of the gears to the shaft, and a dog which extends radially into a V-groove disposed excentrically in relation to a rotational axis of the engaging sleeve and which is joined to a pin housed in a bore in a rotatable sleeve element, said bore running excentrically relative to the axis of rotation of the sleeve element so that rotation of the sleeve element results in displacement of the dog in the longitudinal direction of said shaft, and the dog being connected to the pin via an articulated joint so that when the sleeve element is rotated the dog pivots relative to the pin around at least one pivot axis which is parallel to the rotational axis of the engaging sleeve.

2. Transmission according to claim 1, wherein the articulated joint is a ball-and-socket joint.

3. Transmission according to claim 1, wherein the dog has a profile adapted to the V-shaped groove and extends over approximately a semicircle.

4. Transmission according to claim 2, wherein the dog has a central portion in connection to the ball-and-socket joint and end portions, which extend deeper into the V-shaped groove than do the portions therebetween.

* * * * *